United States Patent
Ballagh et al.

(10) Patent No.: US 7,707,019 B1
(45) Date of Patent: Apr. 27, 2010

(54) COMMAND BUFFERING FOR HARDWARE CO-SIMULATION

(75) Inventors: Jonathan B. Ballagh, Boulder, CO (US); Chi Bun Chan, Longmont, CO (US); Nabeel Shirazi, San Jose, CA (US); Roger B. Milne, Boulder, CO (US)

(73) Assignee: XILINX, Inc., San Jose, CA (US)

( * ) Notice: Subject to any disclaimer, the term of this patent is extended or adjusted under 35 U.S.C. 154(b) by 932 days.

(21) Appl. No.: 11/234,529

(22) Filed: Sep. 23, 2005

(51) Int. Cl.
*G06F 17/50* (2006.01)
(52) U.S. Cl. .................................................. 703/13
(58) Field of Classification Search .................... 703/13
See application file for complete search history.

(56) References Cited

U.S. PATENT DOCUMENTS

| | | | | |
|---|---|---|---|---|
| 6,150,839 | A * | 11/2000 | New et al. ..................... | 326/40 |
| 6,202,044 | B1 * | 3/2001 | Tzori ........................... | 703/28 |
| 6,307,860 | B1 * | 10/2001 | Joffe et al. ................... | 370/412 |
| 6,883,147 | B1 * | 4/2005 | Ballagh et al. ................ | 716/1 |
| 6,985,011 | B1 * | 1/2006 | Do .............................. | 326/38 |
| 7,085,976 | B1 * | 8/2006 | Shirazi et al. ................ | 714/725 |
| 2003/0225565 | A1 * | 12/2003 | Garcia et al. .................. | 703/23 |
| 2004/0260528 | A1 * | 12/2004 | Ballagh et al. ................ | 703/14 |
| 2005/0039174 | A1 * | 2/2005 | Liu et al. ..................... | 717/140 |

OTHER PUBLICATIONS

Xilinx, Sep. 2004, Virtex-4 Configuration Guide, p. 1-108.*
U.S. Appl. No. 11/650,176, filed Jan. 5, 2007, Shirazi, Nabeel, et al., Xilinx, Inc. 2100 Logic Drive, San Jose, CA 95124.
U.S. Appl. No. 11/343,367, filed Jan. 31, 2006, Chan, C.B. et al., Xilinx, Inc. 2100 Logic Drive, San Jose, CA 95124.
U.S. Appl. No. 11/314,486, filed Dec. 21, 2005, Ballagh, Jonathan B., et al., Xilinx, Inc. 2100 Logic Drive, San Jose, CA 95124.
Data2Mem Memory Tool, accessible from http://www.xilinx.com/products/ipcenter/dr_dt_data2men.htm, Xilinx, Inc. 2100 Logic Drive, San Jose, CA 95124, 1 page, Aug. 31, 2007.

* cited by examiner

*Primary Examiner*—Paul L Rodriguez
*Assistant Examiner*—Eunhee Kim
(74) *Attorney, Agent, or Firm*—Kevin T. Cuenot

(57) ABSTRACT

A method of co-simulation involving a high level modeling system and an integrated circuit such as, e.g., a programmable logic device (PLD) can include, when writing to at least one input port of the PLD, storing a plurality of commands from a co-simulation engine within a command buffer and, responsive to a send condition, sending the plurality of commands to the PLD as a single transaction. When reading from at least one output port of the PLD, selectively reading from a cache external to the PLD or a memory of the PLD according to a state of cache coherency.

20 Claims, 3 Drawing Sheets

COMMAND BUFFERING FOR HARDWARE CO-SIMULATION

BACKGROUND

1. Field of the Invention

The present invention relates to the field of integrated circuits and, more particularly, to co-simulating physical implementations of integrated circuits with software environments.

2. Description of the Related Art

Electronic circuit designs can be constructed, simulated, debugged, and translated into electronic hardware using a High Level Modeling System (HLMS). Typically, an HLMS is implemented as a software-based design tool which provides blocks that can be combined to build a circuit design. A block refers to a high level software construct which represents a particular circuit function, such as multiplexing, addition, multiplication, or the like. The blocks can be arranged within the HLMS to form a circuit and/or system. Communication among the blocks can be represented by wires, or signals, which graphically link the blocks. Once configured, the HLMS can run various simulations upon the design. The HLMS further can generate a hardware implementation from the block representation of the circuit design. For example, an HLMS can generate the bitstream necessary to program a field programmable gate array (FPGA) or can generate hardware description language (HDL) files necessary to specify the hardware design.

One example of an HLMS is System Generator™, available from Xilinx, Inc. of San Jose, Calif. System Generator™ is a system level modeling tool that facilitates FPGA hardware design. System Generator™ can function with other design tools to provide a modeling environment that is well suited to hardware design. The System Generator™ tool provides high level abstractions for hardware algorithms and resources using blocks. A block has ports which allow it to be connected to other blocks in a diagram. Two ports are connected together via a net, which allows information, or data, to travel between the ports. System generator blocks can be automatically compiled into an FPGA. In addition, access to underlying FPGA resources can be provided through low level block abstractions which facilitate the construction of highly efficient FPGA designs.

It is possible to incorporate circuit designs, which already have been implemented in hardware, back into the HLMS development environment. FIG. 1 is a schematic diagram illustrating a conventional co-simulation system 100. The co-simulation system 100 depicts the situation in which a hardware implementation has been incorporated into an HLMS environment. As shown, a host computer system 105 can execute an HLMS 110. Within the HLMS 110, a programmable logic device (PLD) 130, for example an FPGA, has been represented by a proxy referred to as a hardware co-simulation block 115. The hardware co-simulation block 115 functions in much the same way as other blocks within the HLMS 110 in that it can consume signals from other blocks of the device under test (DUT) 120 and generate signals that can be interpreted by other blocks of the DUT 120.

The hardware co-simulation block 115 communicates with a co-simulation engine 125, also executing within the host computer system 105. The co-simulation engine 125 typically is provided by the vendor of the PLD 130 which has been incorporated into the HLMS 110 via the hardware co-simulation block 115 proxy. While shown independently of the HLMS 110, the co-simulation engine 125 usually integrates with the HLMS 110 as a plug-in. In any case, the co-simulation engine 125 communicates with the hardware platform 135, i.e., a simulation board upon which PLD 130 is disposed. In general, the hardware co-simulation block 115 executes generic function calls to the co-simulation engine 125. These generic function calls can include, but are not limited to, opening and closing commands directed to the hardware platform 135, commands for managing data I/O with the hardware platform 135, and commands for controlling clock sources for the PLD 130.

When the HLMS 110 compiles a particular circuit design, in this case the DUT 120, for hardware co-simulation, an HDL wrapper 140 can be generated. The HDL wrapper 140 specifies a memory map interface as well as clock control logic. The memory map interface sets aside a portion of memory in the PLD 130 itself which can be used to store input and output values for the co-simulated circuit, or the DUT 120. Elements of the memory map correspond to I/O ports on the hardware co-simulation block 115. The hardware co-simulation block 115 reads and writes to specific ports on the DUT 120 by generating an address that can be decoded by the memory map. The address is computed using the index of a hardware co-simulation block port to generate an address offset.

The co-simulation engine 125 translates the generic function calls from the hardware co-simulation block 115 into instructions specific to the hardware platform 135, and thus the PLD 130. The instructions are sent from the co-simulation engine 125 to the hardware platform 135 via a communication channel 145. Typically, the communication channel 145 is the channel and/or interface provided by the hardware platform 135, for example an interface such as PCI, JTAG (IEEE Standard 1149.1), USB, Ethernet, or the like.

With respect to co-simulation, speed often is critical. As such, certain communication interfaces and protocols are better suited for co-simulation than others. In general, the performance of a communication interface and protocol, as it relates to co-simulation, can be measured in terms of latency and available bandwidth. While bandwidth can be an important factor in the performance of a communication interface, typically it is less significant than latency. Latency, as used herein, can refer to the total delay, inclusive of transaction setup time, associated with transmitting to, or receiving data from, the hardware platform 135.

During co-simulation, new transactions are initiated from the co-simulation engine 125 to the hardware platform 135 under several different circumstances. These circumstances can include, but are not limited to, the case where an input port value changes on the hardware co-simulation block 115, the case where a hardware co-simulation block 115 output port must be updated, or the case where the hardware clock must be run in order to keep the PLD 130 in lockstep with the HLMS 110 simulation. It is also necessary for the co-simulation engine 125 to communicate with the hardware platform 135 to initialize and close the PLD 130. In such circumstances, however, latency does not significantly contribute to the overall simulation performance.

The amount of data transmitted for each individual transaction can vary. For I/O port updates, the data size typically is small (e.g., 64 bits). The different transactions outlined above are performed frequently in the context of co-simulation. The number of transactions performed per simulation cycle is proportional to the number of I/O ports on the hardware co-simulation block 115. As used herein, a simulation cycle in the HLMS 110 corresponds to a tick of the clock of the synchronization mechanism which drives the various components of the so-simulation. One example of a synchronization mechanism is Simulink®, which is a platform for multidomain simulation and model-based design for dynamic systems, available from The MathWorks, Inc. of Natick, Mass. The synchronization mechanism can advance time forward, update data, and then advance time again. The time period beginning with a time advance and ending with a next time advance can be referred to as a simulation cycle. In general, a simulation cycle corresponds to a number of clock cycles in the PLD 130. While the number of PLD 130 clock cycles that correspond to a simulation cycle can vary, the number does remain constant within a given co-simulation session.

Frequent small transactions exchanged between the host computer system 105 and the hardware platform 135, which are inherent to co-simulation, can adversely affect data throughput when the communication interface and/or protocol is associated with high latency. For instance, the HLMS 110 simulation time cannot advance forward until the output port of a co-simulation block is updated, as there may be downstream blocks in the diagram which depend on such data. Bandwidth effectively is wasted in repeated transactional overhead or setup. Lower throughput can significantly hinder HLMS simulation performance. Further, this manner of co-simulation communication does not scale well as the number of ports on the hardware co-simulation block 115 increases.

It would be beneficial to provide a technique for exchanging data between a PLD and an HLMS in the context of co-simulation which overcomes the difficulties described above.

SUMMARY

The present invention provides methods relating to hardware co-simulation involving a High Level Modeling System (HLMS) and a programmable logic device (PLD). One embodiment of the present invention can include storing a first hardware co-simulation command within a command buffer and returning from a function call that initiated the first hardware co-simulation command without causing the first hardware co-simulation command to be sent to the PLD. At least a second hardware co-simulation command can be stored within the command buffer. Responsive to detecting a send condition, the first and the second hardware co-simulation commands from the command buffer can be sent to a destination as a single transaction.

In one embodiment, the send condition can include, responsive to the step of storing at least a second command, determining that a hardware co-simulation block communicatively linked with a co-simulation engine does not include an output port and is operating in free-running clock mode. In another embodiment where the second command is a write command, the send condition can include, responsive to the step of storing at least a second command, determining that the hardware co-simulation block communicatively linked with the co-simulation engine is operating in free-running clock mode.

In another embodiment where the second command is a run command, the send condition can include, responsive to the step of storing at least a second command, determining that the hardware co-simulation block communicatively linked with the co-simulation engine does not include an output port. In yet another embodiment where the second command is a read command, the send condition can include identifying the second command as a read command.

The method also can include first setting a size of the command buffer and clearing contents of the command buffer. Prior to the steps of storing a command and storing at least a second command, the method can include determining whether the command buffer has sufficient space for the command and, if not, increasing the size of the command buffer while preserving contents of the command buffer.

Another embodiment of the present invention can include a method of hardware co-simulation involving an HLMS and a PLD. The method can include, responsive to a first read command of a simulation cycle, populating a cache of the co-simulation engine with contents of a memory map interface between a device under test and the PLD and indicating that cache coherency is clean. For non-read commands, for instance write or run commands, the method can include executing the commands and indicating that the cache coherency is dirty. Responsive to a next read command, data from the cache or the PLD can be selectively read according to the cache coherency.

The step of selectively reading data can include reading data from the cache if the cache coherency is clean and reading data from the PLD if the cache coherency is dirty. In any case, responsive to the next read command where the cache coherency is dirty, the method can include populating the cache with data obtained from the PLD and indicating that the cache coherency is clean. The cache can include an entry for each output port of a hardware co-simulation block executing within the HLMS.

Another embodiment of the present invention can include a method of co-simulation involving an HLMS and a PLD. The method can include, when writing to at least one input port of the PLD, storing a plurality of commands from a co-simulation engine within a command buffer and, responsive to a send condition, sending the plurality of commands to the PLD as a single transaction. When reading from at least one output port of the PLD, the method can include selectively reading from a cache external to the PLD or from the PLD according to a state of cache coherency.

In one embodiment, the send condition can include determining that a hardware co-simulation block, communicatively linked with the co-simulation engine, does not include an output port and is operating in free-running clock mode. In another embodiment, where the plurality of commands includes a first command and a subsequent write command, the send condition can include, responsive to the subsequent write command, determining that the hardware co-simulation block communicatively linked with the co-simulation engine is operating in free-running clock mode.

In another embodiment, where the plurality of commands includes a first command and a subsequent run command, the send condition can include, responsive to the subsequent run command, determining that the hardware co-simulation block communicatively linked with the co-simulation engine does not include an output port. In still another embodiment, where the plurality of commands includes a first command and a subsequent read command, the send condition can include receiving the subsequent read command.

The step of selectively reading can include, responsive to a first read command of a simulation cycle, writing data from the PLD to the cache of the co-simulation engine and indicating that cache coherency is clean. For non-read commands, the selectively reading step can include executing the commands and indicating that the cache coherency is dirty. The selectively reading step further can include, responsive to a next read command, selectively reading data from the cache or the memory of the PLD according to the cache coherency.

Yet another embodiment of the present invention can include a machine readable storage, having stored thereon a computer program having a plurality of code sections executable by a machine for causing the machine to perform the various steps described herein.

BRIEF DESCRIPTION OF THE DRAWINGS

There are shown in the drawings, embodiments which are presently preferred, it being understood; however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

The present invention provides a solution for improved performance in the context of co-simulation involving integrated circuits. In accordance with the embodiments disclosed herein, communication between a High Level Modeling System (HLMS) and a hardware platform can be improved by incorporating a command buffer within a co-simulation engine. The co-simulation engine can be configured to store, temporarily, a plurality of commands intended for the hardware platform within the command buffer. The commands can be sent as a single transaction. This allows a plurality of commands to be sent to the hardware platform while incurring the overhead, with respect to the communication interface and/or protocol used, of a single transaction. Further, a cache can be incorporated into the co-simulation engine which allows information that typically would be read from the hardware platform and relayed back to the hardware co-simulation block to be read directly from the cache in selected circumstances. By using either or both of the mechanisms described, the speed and efficiency of co-simulation can be increased.

Figure 1:
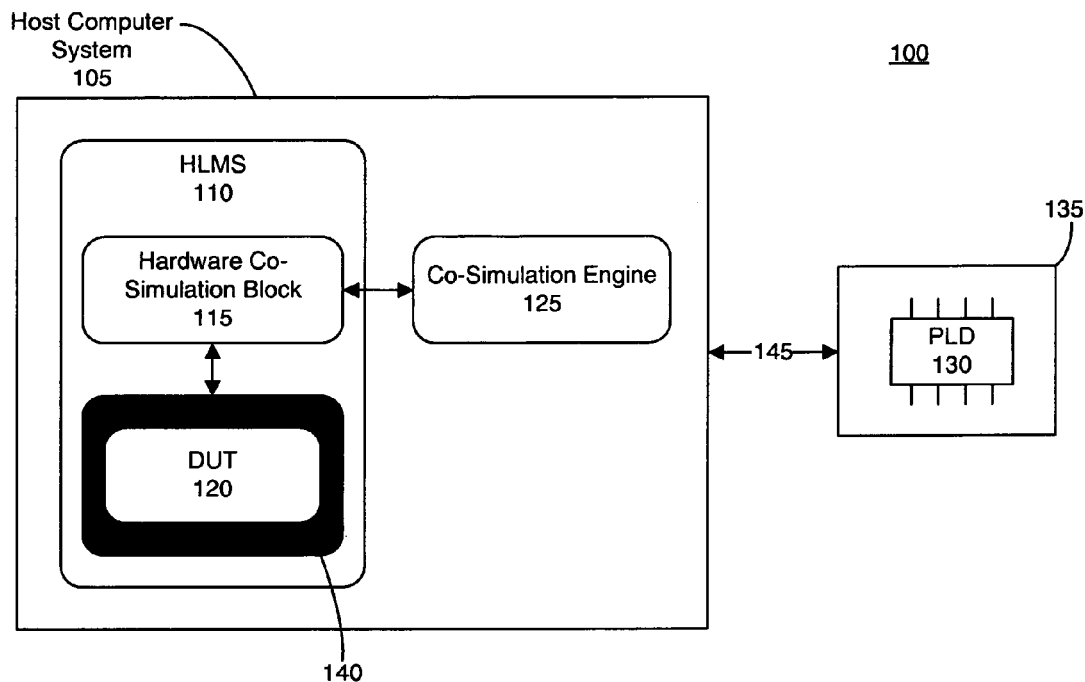
FIG. 1 is a schematic diagram illustrating a conventional co-simulation system.
Figure 2:
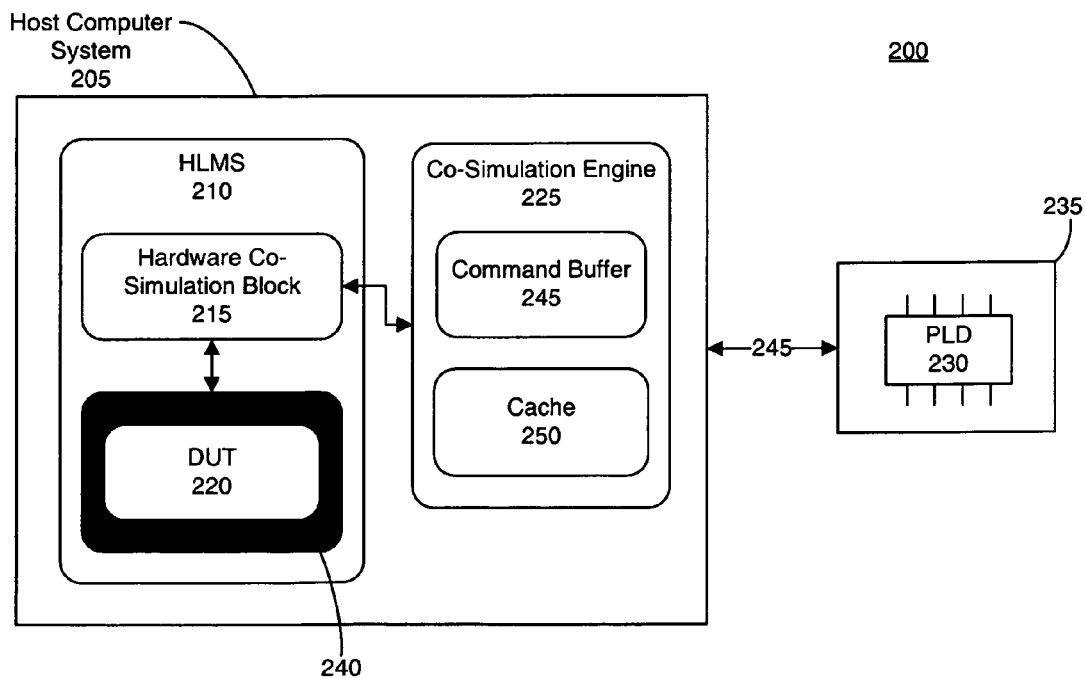
FIG. 2 is a schematic diagram illustrating a system for performing co-simulation in accordance with one embodiment of the present invention.

FIG. 2 is a schematic diagram illustrating a system 200 for performing co-simulation in accordance with one embodiment of the present invention. As shown, system 200 can include a host computer system 205 which can execute an HLMS 210 and a co-simulation engine 225. The HLMS 210 can include a hardware co-simulation block 215, a device under test (DUT) 220, as well as a wrapper 240. The co-simulation engine 225 can include a command buffer 245 and a cache 250.

Co-simulation is the process of breaking a design into two or more pieces and simulating one or more of the pieces using subsidiary design tools. As noted, hardware co-simulation refers to the situation in which a hardware design, in this case PLD 230, is incorporated within a software simulation environment such as HLMS 210. This allows a PLD 230 programmed to emulate a portion, or entirety, of the DUT 220 using hardware resources. This portion of the design is emulated in conjunction with the other portions of the DUT simulating in the HLMS 210. For example, the DUT 220 can represent a user design implemented in the HLMS 210. The PLD 230, which can be a field programmable gate array or the like, can be disposed within a hardware platform 235 and is coupled to the host computer system 205 via communication link 245. Communications between the host computer system 205 and the hardware platform 235 can be conducted and formatted according to a specified communication interface and/or protocol such as PCI, JTAG (IEEE Standard 1149.1), USB, Ethernet, IEEE 1394, PCMCIA, or the like. The listing of communication protocols that can be used is not intended to be exhaustive, but merely to serve as an example of the different communication protocols that can be used.

Hardware co-simulation block 215 is a software proxy for the PLD 230. As noted, the hardware co-simulation block 215 can function much the same way as other software blocks of the HLMS 210 in that signals from other blocks of the DUT 220 can be consumed by the hardware co-simulation block 215 and signals generated by hardware co-simulation block 215 can be provided to, and interpreted by, other blocks of the DUT 220.

The hardware co-simulation block 215 communicates with the co-simulation engine 225, also executing within the host computer system 205. In general, the hardware co-simulation block 215 executes generic function calls to the co-simulation engine 225. These generic function calls can include, but are not limited to, opening and closing the hardware platform 235, managing data I/O with the hardware platform 235, and controlling clock sources for the PLD 230.

The co-simulation engine 225 translates the generic function calls from the hardware co-simulation block 215 into instructions specific to the hardware platform 235, and thus, the PLD 230. The instructions are sent from the co-simulation engine 225 to the hardware platform 235 via the communication channel 245. In accordance with the inventive arrangements disclosed herein, the co-simulation engine 225 can include a command buffer 245 and a cache 250. It should be appreciated that while the command buffer 245 and the cache 250 are shown as two distinct memories, that each can be implemented using a same physical memory.

The command buffer 245 and the cache 250 each help to reduce the amount of time needed to communicate with the PLD 230 and/or the hardware platform 235 in a co-simulation environment. Any communication between the host computer system 205 and the PLD 230 and/or the hardware platform 235 requires a minimum amount of time in which the transaction or communication is constructed, sent, and interpreted. While this overhead can vary from one communication protocol to another, the amount of time needed to interact with the PLD 230 and/or the hardware platform 235 may be significantly longer than the amount of time needed to conduct internal HLMS 210 communications.

The command buffer 245 can be used to store, on a temporary basis, commands to be sent to the PLD 230. Rather than sending each command individually as it is initiated, commands to be sent to the PLD 230 can be collected within the command buffer 245. The commands can be packaged together as a single transaction and then sent to the PLD 230 responsive to a send condition. This allows multiple transactions, or commands, to be sent while incurring the communication protocol and/or interface overhead of a single transaction.

The cache 250 can be configured to store output port values of the hardware co-simulation block 215. The cache 250 can be refreshed from time to time as will be discussed herein in greater detail. In selected circumstances within the co-simulation environment, valid data can be obtained from the cache 250 rather than performing a read of the PLD 215 output ports and transferring that data to the simulation block 215 output ports. When data is read from the cache 250 rather than the PLD 230, communication protocol and/or interface overhead is reduced since the data is being obtained from the host computing system 205.

When the HLMS 210 compiles a circuit design, in this case the DUT 220, for hardware co-simulation, it generates the HDL wrapper 240. The HDL wrapper 240 specifies a memory map interface as well as clock control logic. The memory map interface sets aside a portion of memory in the PLD 230 which can be used to store input and output values for the co-simulated circuit, specifically the DUT 220. Elements of the memory map correspond to I/O ports on the hardware co-simulation block 215. The hardware co-simulation block 215 reads and writes to specific ports on the DUT 220 by generating an address that can be decoded by the memory map. The address is computed using the index of a hardware co-simulation block port to generate an address offset.

Figure 3:
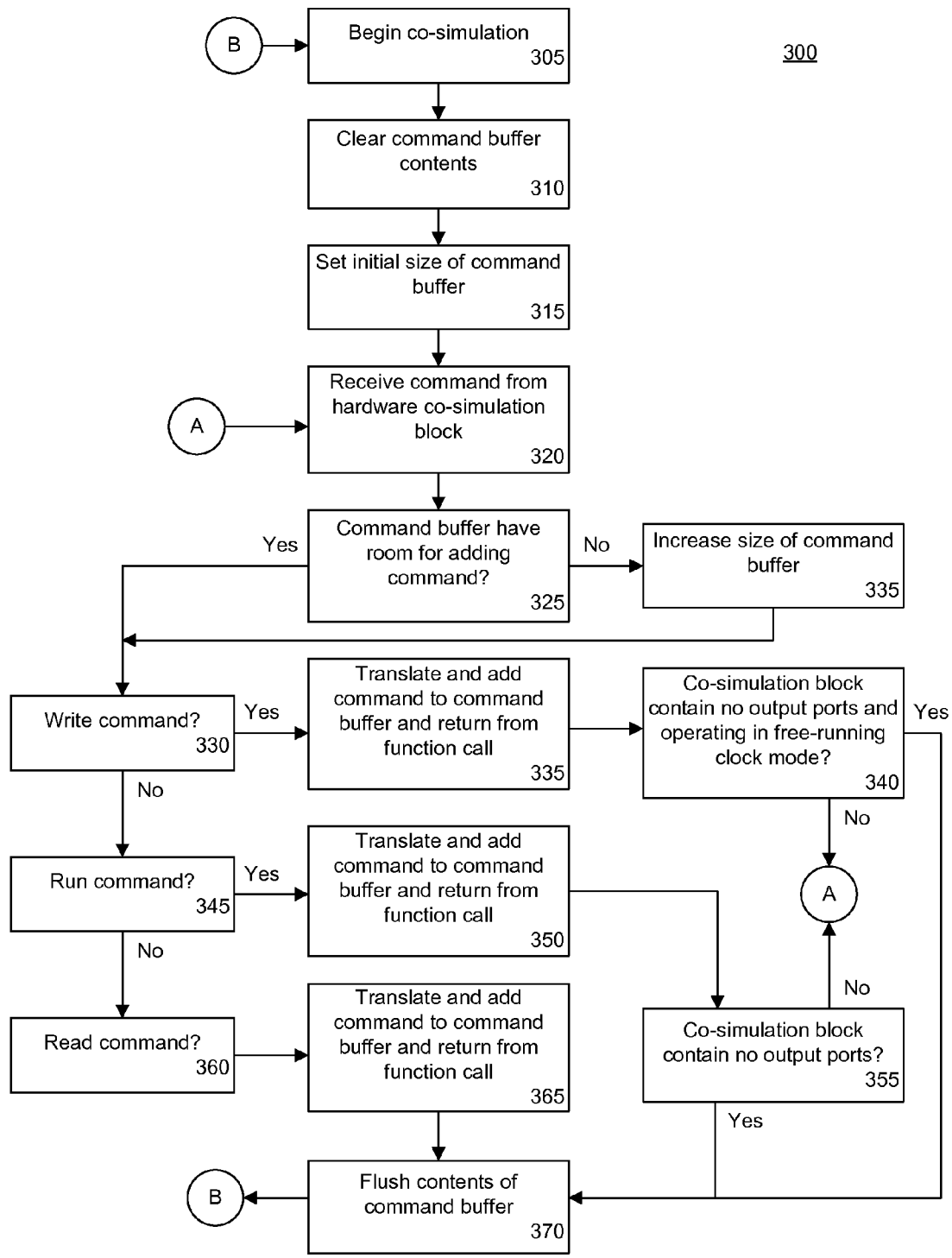
FIG. 3 is a flow chart illustrating a method of co-simulation between a High Level Modeling System and a programmable logic device in accordance with one embodiment of the present invention.

FIG. 3 is a flow chart illustrating a method 300 of co-simulation between an HLMS and a PLD in accordance with one embodiment of the present invention. In one embodiment, method 300 can be performed using the system illustrated with reference to FIG. 2. Despite the particular manner in which such a system is implemented, method 300 illustrates a method of operation relating to a co-simulation engine having a command buffer incorporated therein.

The method can begin in step 305 where co-simulation involving a PLD and an HLMS can begin. In step 310, the command buffer contents can be cleared and/or emptied. In step 315, an initial size of the command buffer can be established. That is, the command buffer can be established in memory with a predetermined size. In step 320, the co-simulation engine can receive a command from the hardware co-simulation block.

In step 325, the co-simulation engine can determine whether the command buffer has sufficient space for storing the received command. If so, the method can proceed to step 330. If not, the method can proceed to step 328 where the size of the command buffer can be increased. The command buffer size can be increased without deleting or otherwise losing any of the contents stored within the command buffer thus far in the co-simulation. In one embodiment, the command buffer can be automatically doubled in size. Doubling the command buffer in size ensures that the command buffer will not be continually resized during a given co-simulation session. It should be appreciated, however, that any of a variety of different sizing algorithms can be applied to increase the size of the command buffer. As such, the present invention is not to be limited to any one particular method or technique for resizing the command buffer.

In step 330, the co-simulation engine can determine whether the command received from the hardware co-simulation block is a write command. If so, the method can proceed to step 335. If not, the method can continue to step 345. As noted, the hardware co-simulation block can generate high level commands such as open, close, read, write, or the like. In step 335, responsive to receiving the command, the co-simulation engine can translate the high level command into one that is formatted and tailored to be understood by the PLD and/or corresponding hardware platform. The translated command can be added to the command buffer. Once added, the co-simulation engine can return from the function call that initiated the sending of the command to the co-simulation engine from the hardware co-simulation block. While the command is stored within the command buffer, it is neither forwarded to the hardware platform nor executed.

In step 340, the co-simulation engine can make a determination as to whether the hardware co-simulation block contains any output ports and whether the PLD is operating in free-running clock mode. Because the received command is a write command, the hardware co-simulation block will not contain any output ports to be read. If the hardware co-simulation block contains no output ports and the PLD is running in free-running clock mode, the method can proceed to step 370, where the contents of the command buffer are flushed. Otherwise, the method loops back to step 320 to continue processing commands from the hardware co-simulation block.

Free-running clock mode refers to whether the hardware platform, and thus the PLD, is running in an asynchronous mode which is not synchronized with the FILMS. Unlike single-step clock mode, where the synchronization mechanism, i.e. Simulink®, generates the PLD clock, in free-running mode, the hardware clock runs continuously inside the PLD. In free-running clock mode, simulation is not bit and cycle true to the original model since the synchronization mechanism is only sampling the internal state of the hardware at the times when the synchronization mechanism awakens the hardware co-simulation block. The PLD port I/O is no longer synchronized with events in the synchronization mechanism. When an event occurs on a synchronization mechanism port, the value is either read from or written to the corresponding port in hardware at that time. Since an unknown number of clock cycles have elapsed in hardware between port events, however, the current state of the hardware cannot be reconciled to the original HLMS model. For many streaming applications this is desirable as it allows the PLD to operate at full speed, synchronizing only periodically to the synchronization mechanism.

Continuing with step 345, the co-simulation engine can make a determination as to whether the received command from the hardware co-simulation block is a run command. If so, the method can proceed to step 350. Otherwise, the method continues to step 360. In step 350, the received command is translated into one that is understandable to the hardware platform and PLD. The translated command can be stored within the command buffer. After the command is stored, the co-simulation engine can return from the function call that initiated the sending of the command from the hardware co-simulation block. The command is not sent to the PLD for execution.

In step 355, the co-simulation engine can make a determination as to whether the hardware co-simulation block includes output ports. If the hardware co-simulation block includes no output ports, the method can proceed to step 370, where the contents of the command buffer are flushed. Otherwise, the method can proceed to step 320 to receive and process further commands from the hardware co-simulation block.

In step 360, the co-simulation engine can interpret the received command as a read command. Accordingly, in step 365, the command can be translated into a format that is understood by the hardware platform and/or the PLD. The translated command can be added to the command buffer and the co-simulation engine can return from the function call that initiated the sending of the command from the hardware co-simulation block to the co-simulation engine. After step 365, the method can continue to step 370.

In step 370, the contents of the command buffer can be flushed. More particularly, the commands that are stored in the command buffer can be sent to the hardware platform as a single transaction. The command buffer then can be emptied. By sending more than one command as a single transaction, the overhead associated with the communication protocol used between the host computing system and the hardware platform is reduced. It should be appreciated that the bandwidth over the communication channel is better utilized as the size of the transaction data increases. The command buffer effectively allows more than one command to be sent from the host computer system to the hardware platform as a single transaction. Thus, rather than incurring the transactional overhead relating establishing communications with the hardware platform and formatting of commands according to the interface and/or communication protocol to be used for each command to be sent, a plurality of commands can be sent as a single transaction which incurs the transactional overhead of a single command. After step 370, the method can repeat until the co-simulation session ends or is terminated.

Figure 4:
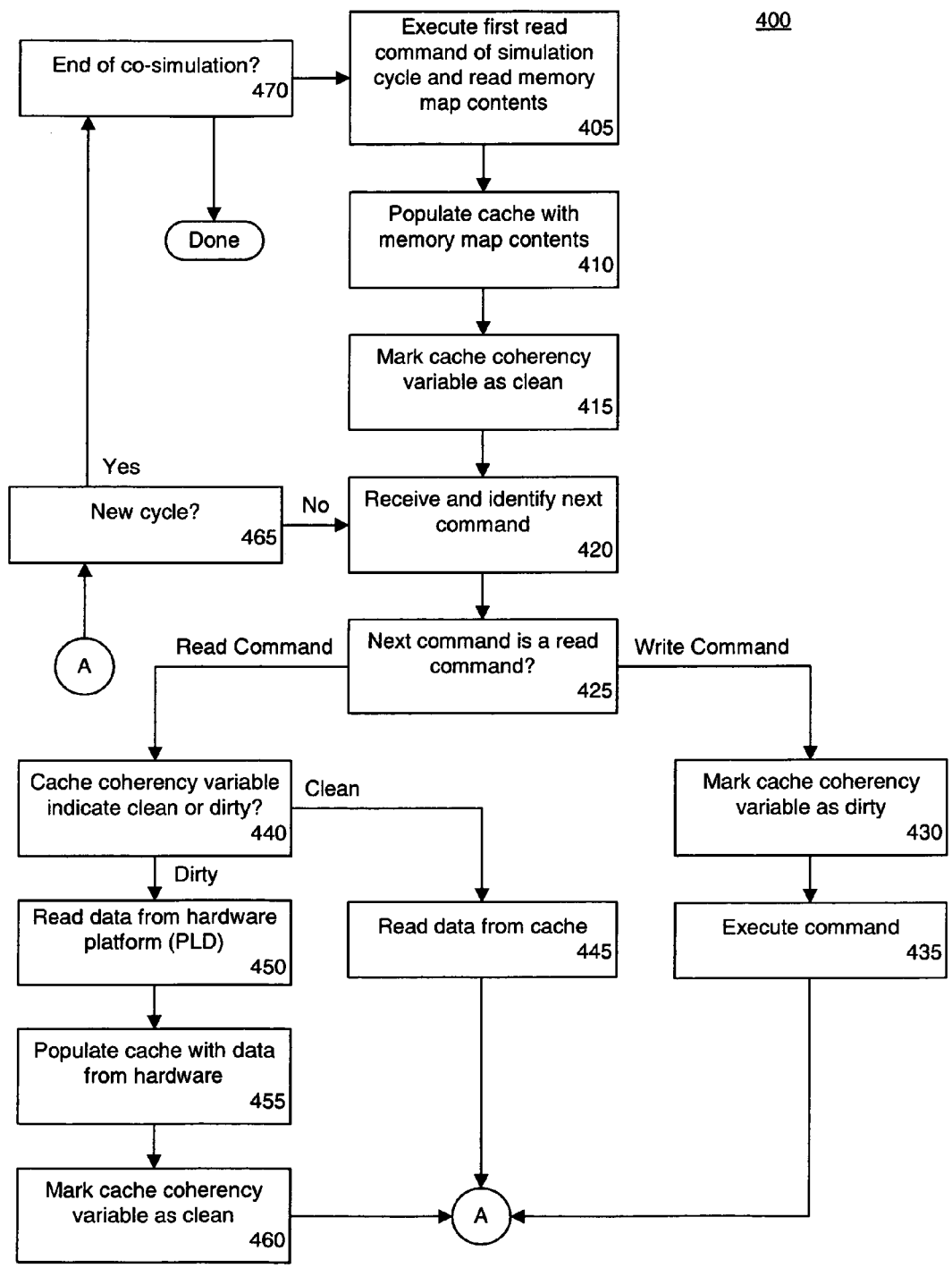
FIG. 4 is a flow chart illustrating a method of co-simulation between a High Level Modeling System and a programmable logic device in accordance with another embodiment of the present invention.

FIG. 4 is a flow chart illustrating a method 400 of co-simulation between an HLMS and a PLD in accordance with another embodiment of the present invention. In one embodiment, method 400 can be performed using the system illustrated with reference to FIG. 2. Method 400 illustrates a method of operation for co-simulation wherein the co-simulation engine 225 includes a cache 250 for storing output port registers of the co-simulation hardware block as specified by a memory map.

Method 400 can begin in step 405 where a first read command of a co-simulation cycle, and/or session, directed to the PLD is received from the hardware co-simulation block by the co-simulation engine. The contents of the memory map can be read at that time. In step 410, the co-simulation engine can populate the cache with the contents of the memory map. As noted, the cache can include one entry for each output port of the hardware co-simulation block. In step 415, a variable maintained within the co-simulation engine can be marked to indicate that the cache is "clean". Marking the cache as clean indicates that the data contained therein is coherent and accurate. Thus, in cases where the state of the cache, also referred to as the cache coherency, is considered clean, data can be read from the cache rather than reading data from the PLD. In such cases, the time needed for communicating with the PLD is effectively eliminated thereby increasing simulation speed.

In step 420, a next command can be received by the co-simulation engine. The command can be identified as a read or a write command. In step 425, a determination can be made by the co-simulation engine as to whether the command is a write command. If so, the method can proceed to step 430 to modify the cache coherency variable to indicate that the state of the cache is "dirty". The write command causes a write action to be executed with respect to the hardware co-simulation block, and accordingly the PLD, which alters the values carried by the output ports of the hardware co-simulation block and PLD. This creates a condition in which the values at the output ports of the PLD no longer match the contents of the cache. The cache coherency state of dirty indicates this condition. In step 435, the command can be executed. The method then can proceed to step 465 to continue processing.

In step 440, in the case where the received command is a read command, the state of the cache coherency variable can be examined by the co-simulation engine. If the cache coherency variable indicates a state of clean, then data can be read from the cache in step 445. If the state of the cache coherency variable is dirty, the method can continue to step 450 where data is read from the PLD rather than from the cache. In step 455, the cache can be repopulated with data from the PLD as specified by the addresses defined by the memory map. Accordingly, in step 460, the state of the cache coherency variable can be marked as clean.

Continuing with step 465, the co-simulation engine can make a determination as to whether a new simulation cycle is beginning. As noted, a simulation cycle refers to a tick of the clock of the synchronization mechanism which drives the various components of the co-simulation environment. If the current simulation cycle is ongoing, the method can proceed to step 420 to continue processing further commands. If a new simulation cycle has begun, the method can proceed to step 470. In step 470, a determination can be made as to whether the current co-simulation session has ended. If so, the method can end. If not, the method can continue to step 405 to continue processing. In that case, the co-simulation engine receives and executes a first read command of a new simulation cycle and repopulates the cache based upon the addresses specified by the memory map. The method continues processing until such time that the co-simulation session ends.

The embodiments disclosed herein provide for a command buffer and a cache incorporated into a co-simulation engine. Using the command buffer and the cache, the amount of time needed for communicating with a hardware platform and accompanying PLD can be reduced, thereby increasing the speed of co-simulation. The command buffer helps to reduce the amount of overhead associated with writing data to the PLD while the cache helps to reduce overhead associated with reading data from the PLD.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein. The present invention also can be embedded in a computer program product, which comprises all the features enabling the implementation of the methods described herein, and which when loaded in a computer system is able to carry out these methods.

The terms "computer program", "software", "application", variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an," as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically, i.e. communicatively linked through a communication channel or pathway or another component or system.

This invention can be embodied in other forms without departing from the spirit or essential attributes thereof. Accordingly, reference should be made to the following claims, rather than to the foregoing specification, as indicating the scope of the invention.

What is claimed is:

1. A method of hardware co-simulation implemented within a computer involving a high level modeling system and an integrated circuit (IC) coupled to the computer, said method comprising:
   simulating a design under test within the computer, wherein at least a portion of the design under test is implemented in hardware within the IC;
   storing a first hardware co-simulation command within a command buffer within a physical memory of the computer, the first hardware co-simulation command controlling operation of the portion of the design under test implemented within the IC;
   returning from a function call that initiated the first hardware co-simulation command without causing the first hardware co-simulation command to be sent from the computer to the IC when no send condition is detected;
   storing at least a second hardware co-simulation command within the command buffer within the physical memory of the computer, the second hardware co-simulation command controlling operation of the portion of the design under test implemented within the IC;
   determining a type of the second hardware co-simulation command; and
   responsive to detecting a send condition during hardware co-simulation comprising identifying the second hardware co-simulation command as a selected type of command, within the computer, packaging the first and at least the second hardware co-simulation commands together and sending the first and at least the second hardware co-simulation commands from the command buffer of the computer to the IC as a single transaction.

2. The method of claim 1, wherein the send condition comprises, responsive to said step of storing at least the second command, determining that a hardware co-simulation block communicatively linked with a co-simulation engine does not include an output port and is operating in free-running clock mode.

3. The method of claim 1, wherein the second command is a write command, the send condition comprising, responsive to said step of storing at least the second command, determining that a hardware co-simulation block communicatively linked with a co-simulation engine is operating in free-running clock mode.

4. The method of claim 1, wherein the second command is a run command, the send condition comprising, responsive to said step of storing at least the second command, determining that a hardware co-simulation block communicatively linked with a co-simulation engine does not include an output port.

5. The method of claim 1, wherein the second command is a read command, wherein the send condition comprises identifying the second command as the read command.

6. The method of claim 1, further comprising:
   determining whether the IC is in free-running clock mode, wherein detecting the send condition during hardware co-simulation further comprises determining that the IC is in free-running clock mode.

7. The method of claim 1, further comprising, prior to said steps of storing a first command and storing at least the second command, determining whether the command buffer has sufficient space for the command and, if not, increasing the size of the command buffer while preserving contents of the command buffer.

8. A method of hardware co-simulation implemented with a high level modeling system (HLMS) executing within a computer and an integrated circuit (IC) coupled to the computer, said method comprising:
   responsive to a first read command of a simulation cycle of the hardware co-simulation, populating a cache of the co-simulation engine with contents of a memory map interface between a device under test and the IC, and indicating that cache coherency is clean, wherein the co-simulation engine, the device under test, and the cache coherency are disposed within the computer, and wherein the cache is implemented within physical memory of the computer;
   for non-read commands, executing the commands and indicating that the cache coherency is dirty, wherein dirty cache coherency indicates that content of the cache does not match content of output port registers of the IC as specified by the memory map interface; and
   responsive to a next read command, selectively reading data from the cache or the IC according to the cache coherency, wherein the IC comprises a hardware implementation of at least a portion of the device under test.

9. The method of claim 8, wherein the non-read command is a write command or a run command.

10. The method of claim 8, said selectively reading step further comprising:
    reading data from the cache if the cache coherency is clean; and
    reading data from the IC if the cache coherency is dirty.

11. The method of claim 8, further comprising, responsive to the next read command wherein the cache coherency is dirty, populating the cache with data obtained from the IC and indicating that the cache coherency is clean, wherein clean cache coherency indicates that content of the cache matches content of the output port registers of the IC as specified by the memory map interface.

12. The method of claim 8, wherein the cache comprises an entry for each output port of a hardware co-simulation block executing within the HLMS.

13. A computer-readable storage, having stored thereon a computer program having a plurality of code sections that, when executed by a computer, cause the computer to perform a plurality of steps, the computer-readable storage comprising:
    when writing to at least one input port of an integrated circuit (IC) within a hardware co-simulation environment executing within a computer, code for storing a plurality of hardware co-simulation commands within a command buffer implemented in physical memory of the computer and, responsive to a send condition, code for sending the plurality of hardware co-simulation commands from the command buffer to the IC as a single transaction; and
    when reading from at least one output port of the IC, code for selectively reading from a cache external to the IC or from the IC according to a state of cache coherency.

14. The machine readable storage of claim 13, wherein the send condition comprises determining that a hardware co-simulation block, communicatively linked with a co-simulation engine, does not include an output port and is operating in free-running clock mode.

15. The machine readable storage of claim 13, wherein the plurality of commands comprises a first command and a subsequent write command, wherein the send condition comprises, responsive to the subsequent write command, determining that a hardware co-simulation block communicatively linked with a co-simulation engine is operating in free-running clock mode.

16. The machine readable storage of claim 13, wherein the plurality of commands comprises a first command and a subsequent run command, wherein the send condition comprises, responsive to the subsequent run command, determining that a hardware co-simulation block communicatively linked with a co-simulation engine does not include an output port.

17. The machine readable storage of claim 13, wherein the plurality of commands comprises a first command and a subsequent read command, wherein the send condition comprises receiving the subsequent read command.

18. The machine readable storage of claim 13, said code for selectively reading further comprises responsive to a first read command of a simulation cycle, code for writing data from the IC to the cache of the co-simulation engine and indicating that cache coherency is clean, wherein clean cache coherency indicates that content of the cache matches content of output port registers of the IC.

19. The machine readable storage of claim 18, said code for selectively reading further comprises, for non-read commands, code for executing the commands and indicating that the cache coherency is dirty, wherein dirty cache coherency indicates that content of the cache does not match content of the output port registers of the IC.

20. The machine readable storage of claim 19, said code for selectively reading further comprises, responsive to a next read command, code for selectively reading data from the cache or the memory of the IC according to the cache coherency.

* * * * *